(12) United States Patent
Pursifull et al.

(10) Patent No.: US 9,010,115 B2
(45) Date of Patent: *Apr. 21, 2015

(54) METHOD AND SYSTEM FOR PROVIDING VACUUM VIA EXCESS BOOST

(75) Inventors: Ross Dykstra Pursifull, Dearborn, MI (US); Joseph Norman Ulrey, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 886 days.

This patent is subject to a terminal disclaimer.

(21) Appl. No.: 13/050,683

(22) Filed: Mar. 17, 2011

(65) Prior Publication Data

US 2012/0237368 A1    Sep. 20, 2012

(51) Int. Cl.
| | |
|---|---|
| *F02B 33/44* | (2006.01) |
| *F02B 33/00* | (2006.01) |
| *F02D 41/00* | (2006.01) |
| *F02B 37/16* | (2006.01) |
| *F02M 35/10* | (2006.01) |
| *F01N 5/04* | (2006.01) |

(52) U.S. Cl.
CPC ........... *F02D 41/0007* (2013.01); *Y02T 10/144* (2013.01); *F02M 35/10236* (2013.01); *F02M 35/10157* (2013.01); *F01N 5/04* (2013.01); *F02D 2250/41* (2013.01); *F02B 37/164* (2013.01)

(58) Field of Classification Search
None
See application file for complete search history.

(56) References Cited

U.S. PATENT DOCUMENTS

| | | | |
|---|---|---|---|
| 3,568,435 A * | 3/1971 | May .................................. 60/353 |
| 4,211,200 A * | 7/1980 | Rocchio et al. .......... 123/339.13 |
| 5,005,550 A * | 4/1991 | Bugin et al. .................. 123/520 |
| 6,120,414 A | 9/2000 | Endo et al. |
| 6,347,608 B1 | 2/2002 | Hara et al. |
| 6,568,175 B2 | 5/2003 | Izumiura et al. |
| 6,735,942 B2 | 5/2004 | Wild et al. |
| 6,773,374 B2 | 8/2004 | Ogawa et al. |
| 6,796,772 B2 * | 9/2004 | Ikeda et al. .................... 417/196 |
| 7,216,479 B2 | 5/2007 | Tamura |
| 7,722,132 B2 * | 5/2010 | Carlsson .................... 303/114.3 |
| 2002/0109401 A1 * | 8/2002 | Ikeda et al. ................ 303/114.3 |
| 2004/0182363 A1 * | 9/2004 | Suzuki ...................... 123/339.11 |
| 2005/0077373 A1 * | 4/2005 | Ikeda ............................... 239/34 |
| 2006/0060175 A1 * | 3/2006 | Sonoda et al. ................ 123/586 |
| 2007/0063579 A1 * | 3/2007 | Carlsson .................... 303/114.3 |
| 2007/0236083 A1 * | 10/2007 | Kawamori et al. ........ 303/114.3 |
| 2008/0267789 A1 | 10/2008 | Hirooka |

(Continued)

FOREIGN PATENT DOCUMENTS

| | | | |
|---|---|---|---|
| JP | 2002371885 A | * | 12/2002 |
| JP | 2004299567 A | * | 10/2004 |

(Continued)

OTHER PUBLICATIONS

English Translation of JP 2005-264758 A.*

(Continued)

*Primary Examiner* — Thomas Denion
*Assistant Examiner* — Jessica Kebea
(74) *Attorney, Agent, or Firm* — Julia Voutyras; Alleman Hall McCoy Russell & Tuttle LLP (57) ABSTRACT

A vacuum source including an ejector is disclosed. In one example, vacuum is supplied via the ejector when a turbocharger has excess boost capacity. The approach can prioritize how excess boost may be used to provide vacuum.

17 Claims, 7 Drawing Sheets

(56) References Cited

U.S. PATENT DOCUMENTS

| | | | |
|---|---|---|---|
| 2010/0012099 A1* | 1/2010 | Kerns et al. | 123/520 |
| 2010/0193311 A1* | 8/2010 | Calnek et al. | 188/357 |
| 2010/0263636 A1* | 10/2010 | Kerns et al. | 123/521 |
| 2011/0307157 A1* | 12/2011 | Pursifull | 701/102 |
| 2012/0016566 A1* | 1/2012 | Cunningham et al. | 701/103 |

FOREIGN PATENT DOCUMENTS

| | | | | |
|---|---|---|---|---|
| JP | 2005264758 A | * | 9/2005 | |
| JP | 2005171925 A | | 6/2006 | |
| JP | 2009133292 A | * | 6/2009 | |
| JP | 2011236825 A | * | 11/2011 | |
| JP | 2013221488 A | * | 10/2013 | |
| KR | 2002080868 A | * | 10/2002 | |
| KR | 2008107172 A | * | 12/2008 | |
| WO | 2008084311 A1 | | 7/2008 | |

OTHER PUBLICATIONS

RD576010 A, Apr. 2012, Research Disclo.*
Cunningham, Ralph Wayne et al., "Method and System for Providing Vacuum," U.S. Appl. No. 13/050,664, filed Mar. 17, 2011, 44 pages.
Pursifull, Ross Dykstra et al., "Intake System Including Vacuum Aspirator," U.S. Appl. No. 12/721,445, filed Mar. 10, 2010, 45 pages.
Pursifull, Ross Dykstra, "Method and System for Prioritizing Vehicle Vacuum," U.S. Appl. No. 13/050,700, filed Mar. 17, 2011, 40 pages.
Karnik, Amey Y. et al., "Engine Vacuum System," U.S. Appl. No. 13/050,647, filed Mar. 17, 2011, 32 pages.
Ulrey, Joseph Norman et al., "Method and System for Operating an Ejector," U.S. Appl. No. 13/050,632, filed Mar. 17, 2011, 35 pages.
Cunningham, Ralph Wayne et al., "A Method for Purging Fuel Vapors," U.S. Appl. No. 12/838,700, filed Jul. 19, 2010, 37 pages.
Cunningham, Ralph Wayne et al., "Method and System for Controlling Vacuum," U.S. Appl. No. 12/899,370, filed Oct. 6, 2010, 30 pages.

* cited by examiner

METHOD AND SYSTEM FOR PROVIDING VACUUM VIA EXCESS BOOST

BACKGROUND/SUMMARY

Vacuum may be used to operate or to assist in the operation of various devices of a vehicle. For example, vacuum may be used to assist a driver applying vehicle brakes, turbocharger operation, fuel vapor purging, heating and ventilation system actuation, and driveline component actuation. Vacuum may be obtained sometimes from an engine intake manifold in normally aspirated engines because the intake manifold pressure is often at a pressure lower than atmospheric pressure. However, in boosted engines where intake manifold pressures are often at pressures greater than atmospheric pressure, intake manifold vacuum may replaced or augmented with vacuum from an ejector. By passing pressurized air though the ejector, a low pressure region may be created within the ejector so that air can be drawn from a vacuum reservoir to the ejector, thereby reducing pressure within the vacuum reservoir. Nevertheless, use of ejector systems may not be desirable during certain engine operating conditions where there may be insufficient air flow from the compressor to provide a desired engine torque.

The inventors herein have recognized the above-mentioned disadvantages and have developed a method for providing vacuum, comprising: supplying air from a compressor to engine cylinders, the compressor having an air output capacity; directing air flow from the compressor to an ejector supplying vacuum to a vacuum reservoir when the compressor has capacity to supply more air than a desired cylinder air amount, otherwise inhibiting air flow from the compressor to the ejector.

By adjusting when air is supplied from a compressor to an ejector, it may be possible to supply a desired amount of vacuum to a vacuum system while at the same time providing an engine air amount that in near the desired engine air amount. For example, during a throttle application by a driver, air flow to an ejector can be inhibited. Shortly after the turbine spins up to speed, air flow to the ejector may be reactivated. Thus, generation of vacuum via the ejector may only be inhibited for a short period of time. Consequently, vacuum may be generated for a substantial amount of time even during vehicle acceleration when intake manifold pressure may be high. Further, if an engine torque demand exceeds a threshold level, air flow to the ejector may be inhibited to provide additional engine torque. Thus, an objective of providing engine torque may be granted priority over producing vacuum during some engine operating conditions. Additional vacuum may be provided via the ejector when the output capacity of the turbocharger compressor exceeds the desired engine air charge. In this way, it may be possible to provide vacuum to a vacuum system while providing a desired amount of torque.

The present description may provide several advantages. For example, the approach may improve engine fuel economy by providing vacuum based on vacuum use rather than simply supplying a high level of vacuum. Further, the approach can prioritize vacuum use and vacuum generation according to operating conditions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
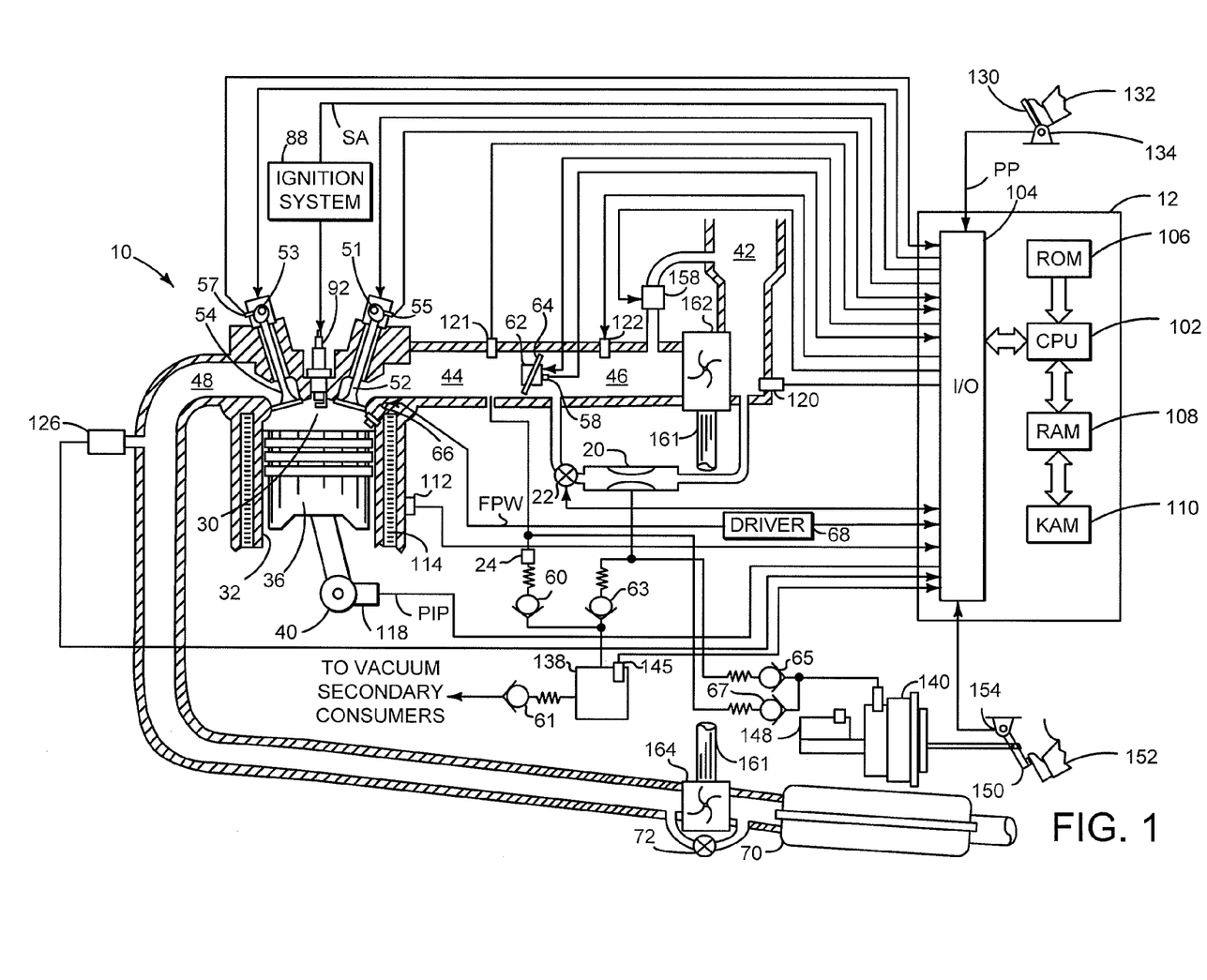
FIGS. 1 and 2 show two different schematic depictions of an engine.
Figure 2:
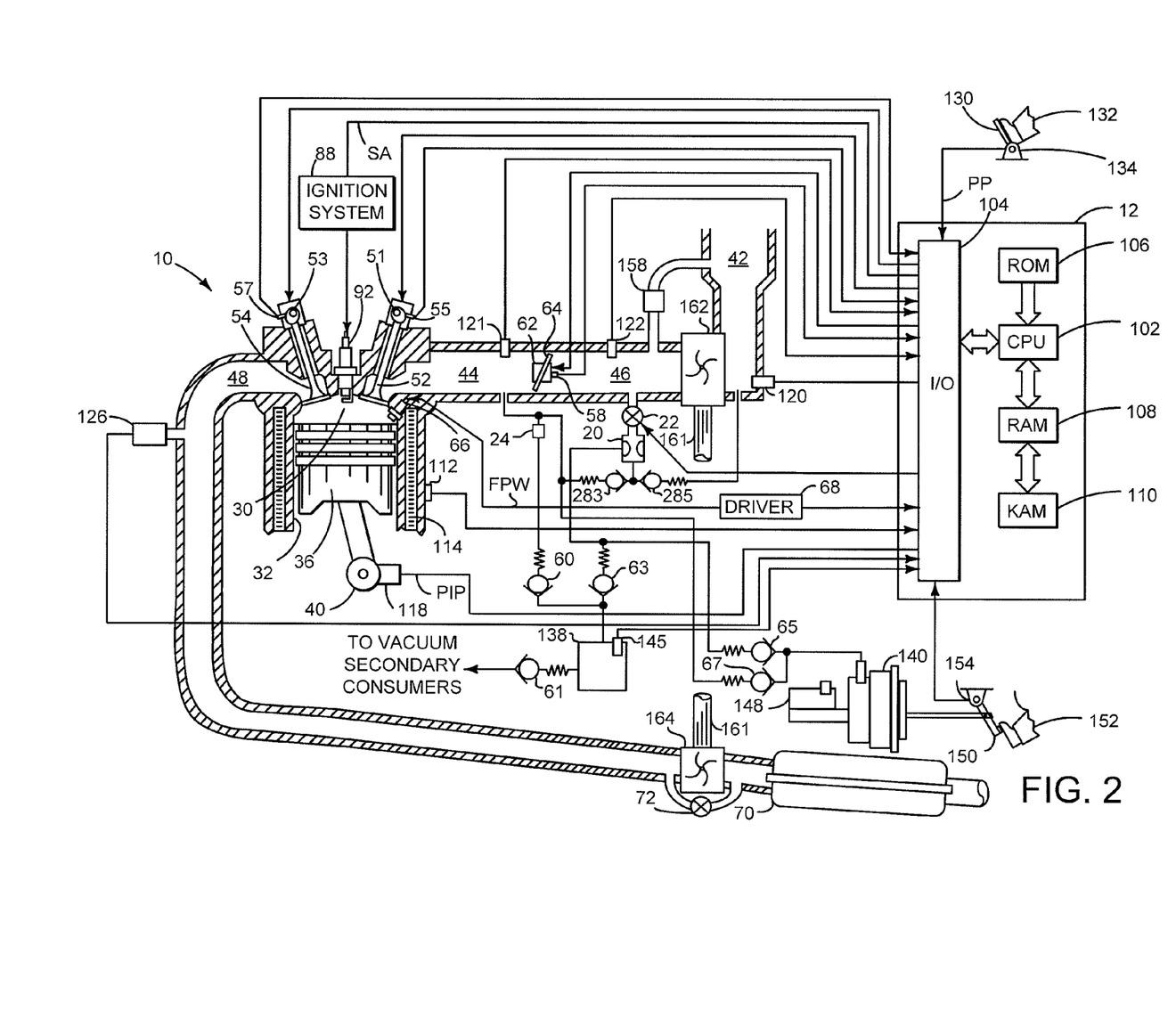
Figure 3:
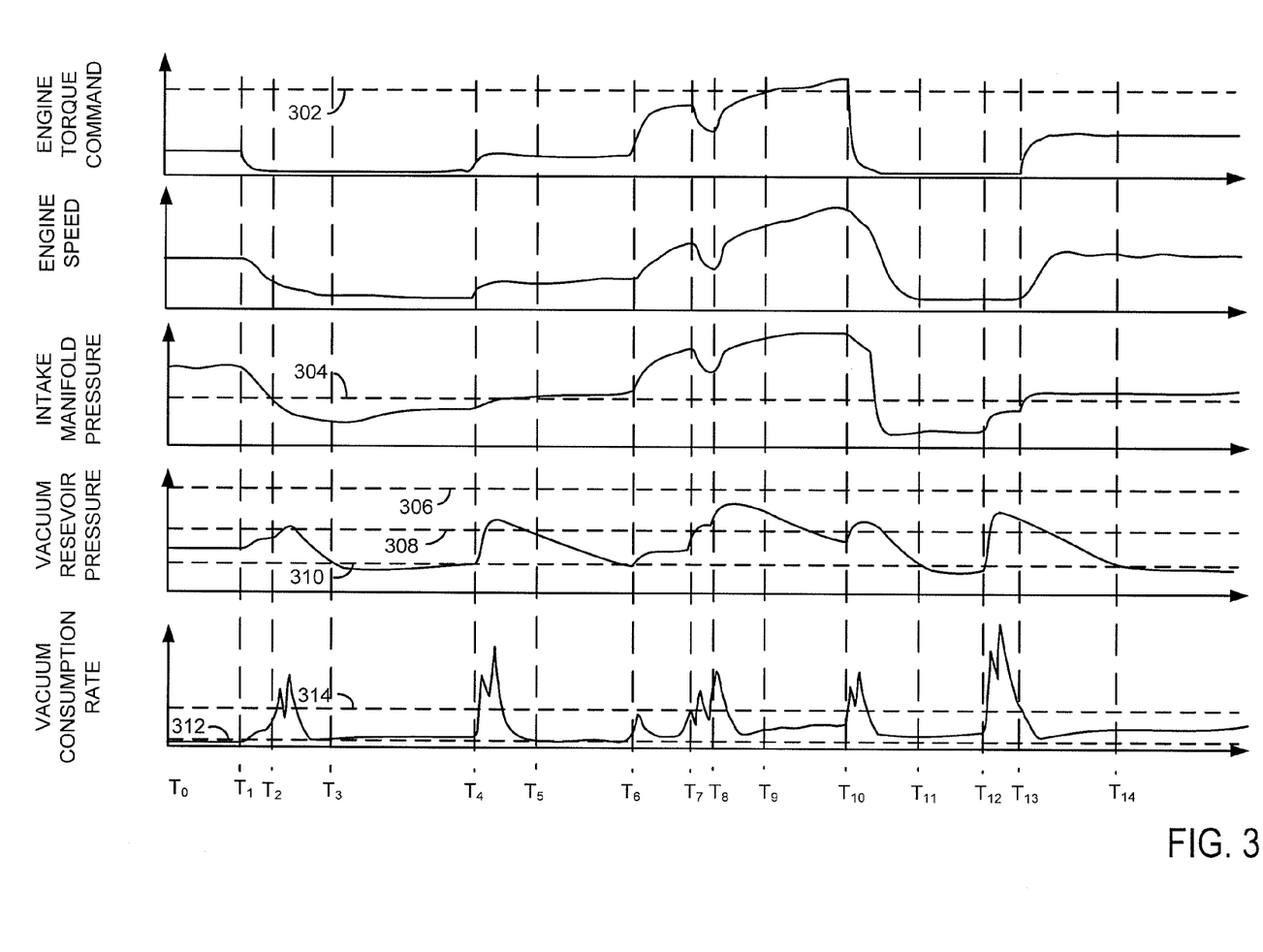
FIGS. 3-6 show simulated signals of interest during engine operation.
Figure 4:
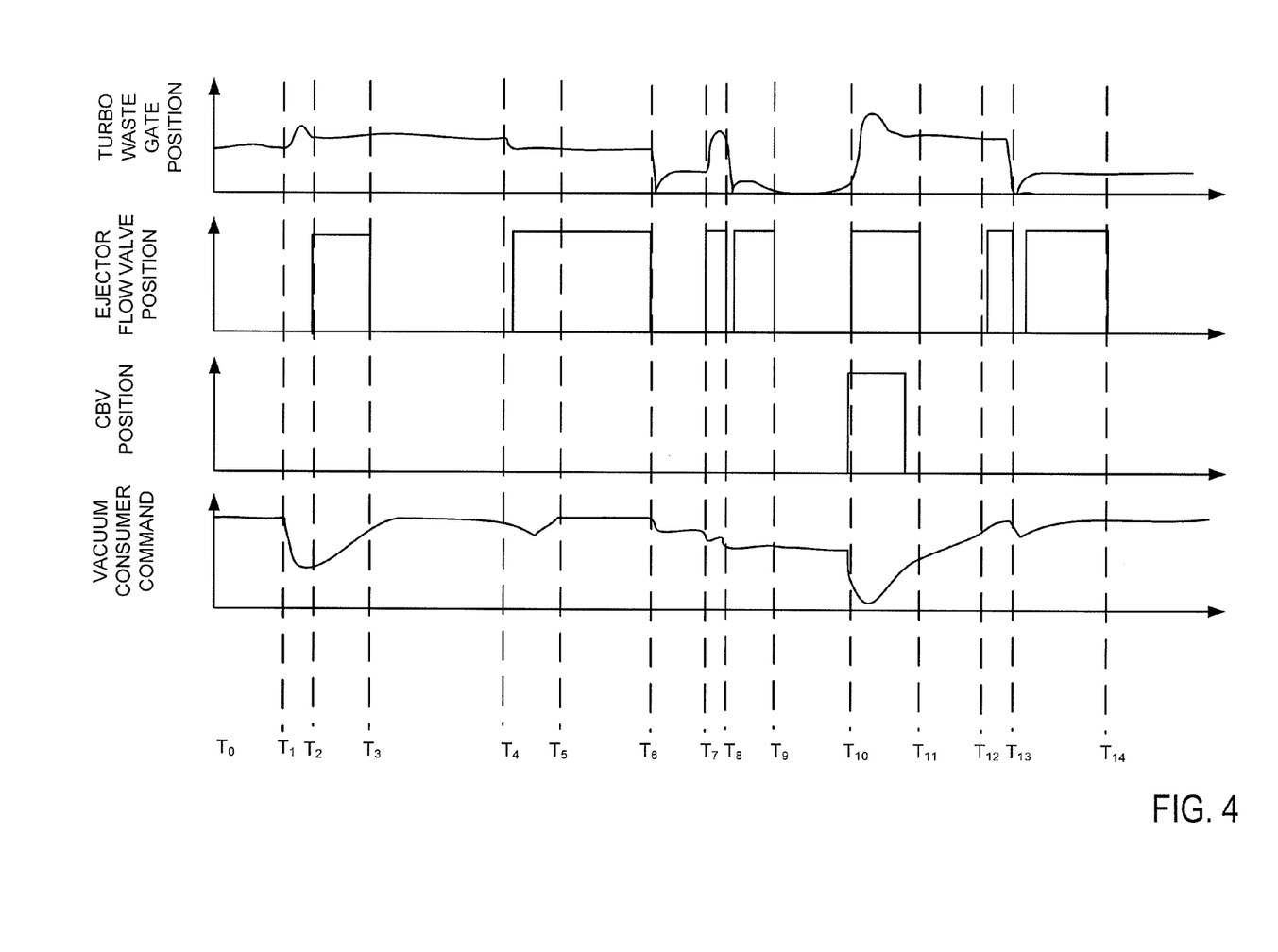
Figure 5:
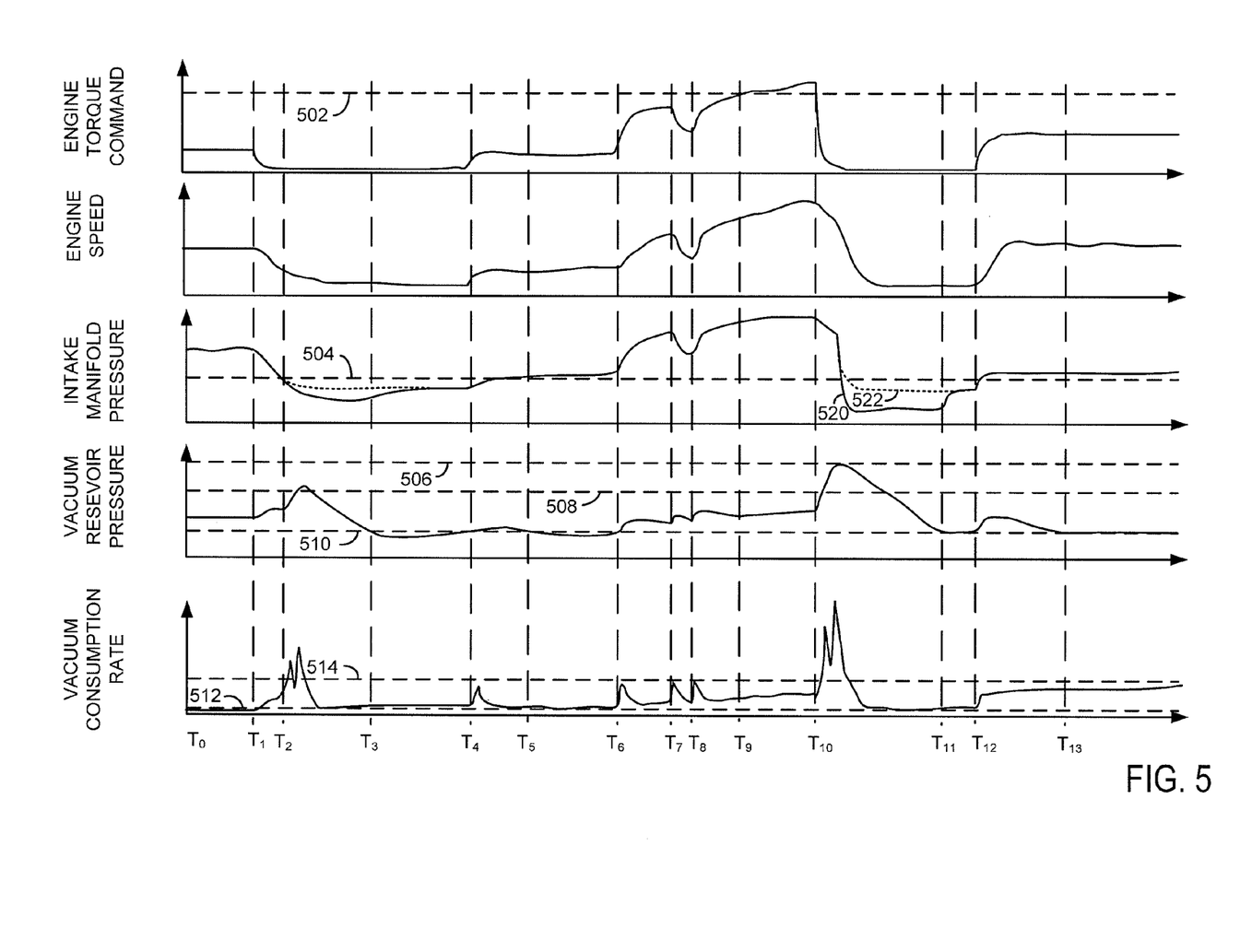
Figure 6:
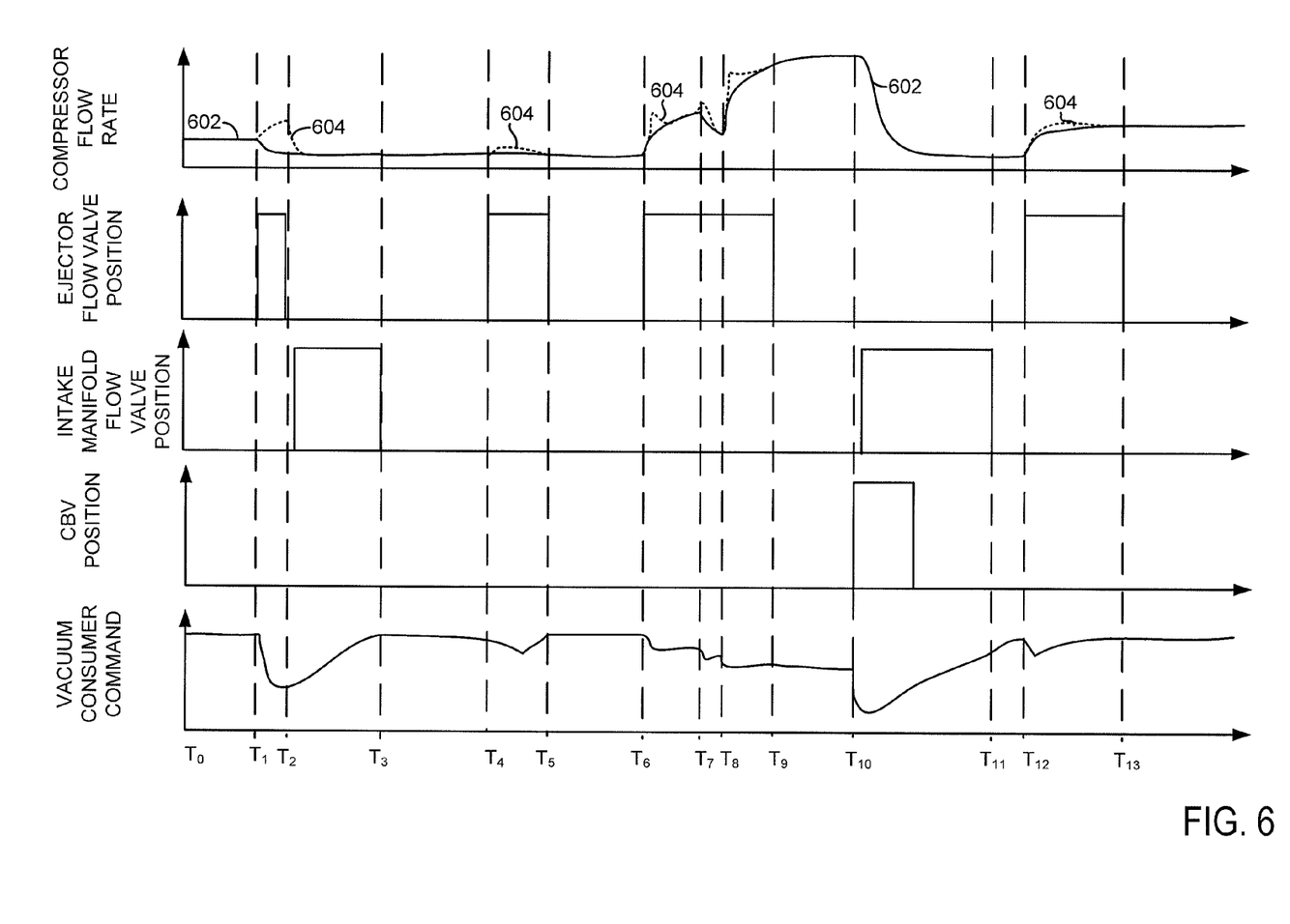
Figure 7:
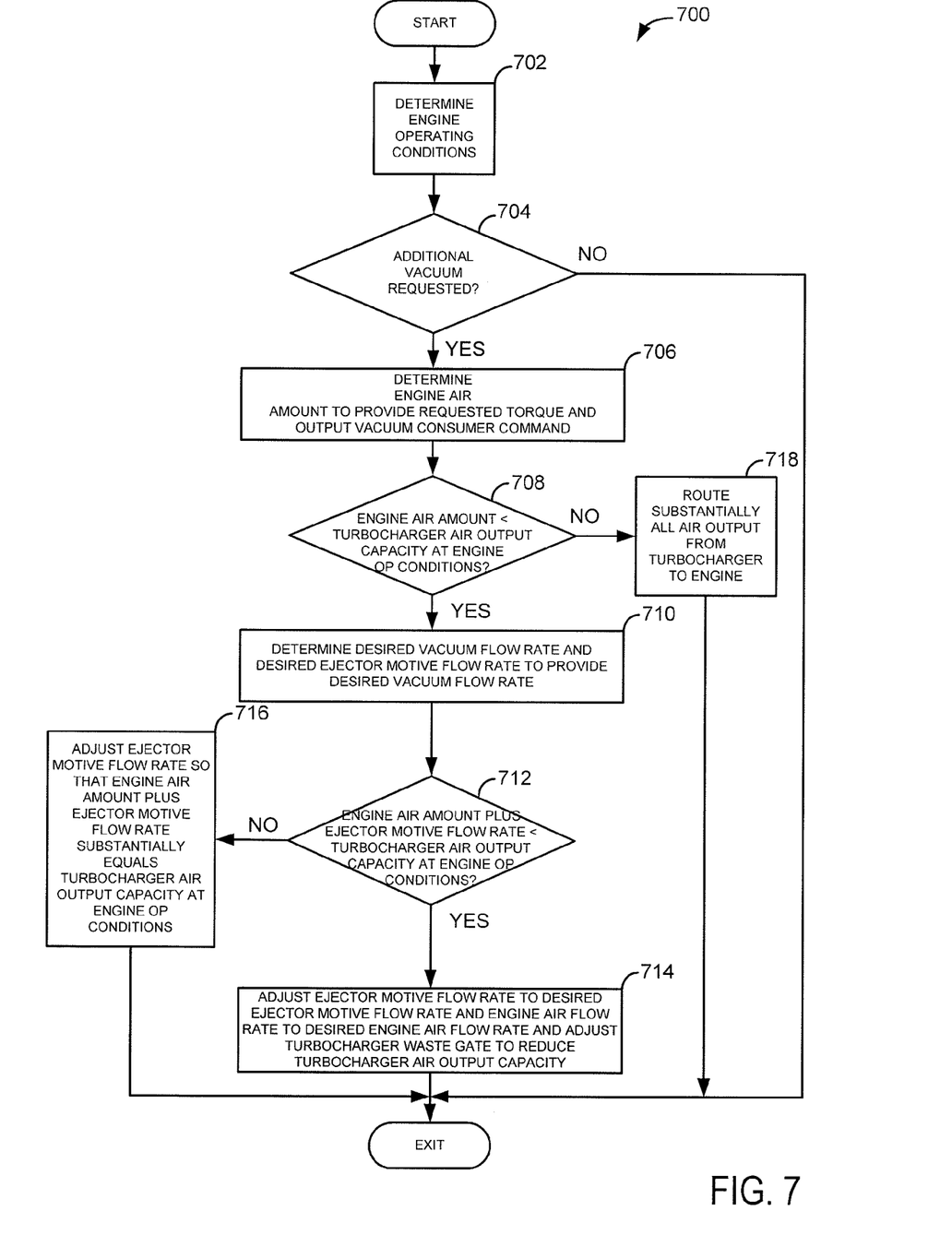
FIG. 7 shows a high level flowchart of a method for providing vacuum to a vacuum system of a vehicle.

The present description is related to providing vacuum to assists in actuator operation. FIGS. 1 and 2 show two examples for providing vacuum to a vehicle vacuum system. FIGS. 3 and 4 show simulated signals of interest when providing vacuum with an engine having a common intake manifold for all engine cylinders. FIGS. 5 and 6 show simulated signals of interest when providing vacuum with an engine having an intake manifold that is split between engine cylinders. For example, a first intake manifold passage supplies air to a first group of engine cylinders, and a second intake manifold passage supplies air to a second group of engine cylinders. Thus, the first intake manifold passage may operate at a first pressure while the second intake manifold passage operates at a second pressure. FIG. 7 shows a method for providing the vacuum and control illustrated in FIGS. 3-6.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from intake boost chamber 46.

Compressor 162 draws air from air intake 42 to supply boost chamber 46. Exhaust gases spin turbine 164 which is coupled to compressor 162 via shaft 161. Vacuum operated waste gate actuator 72 allows exhaust gases to bypass turbine 164 so that boost pressure can be controlled under varying operating conditions. Vacuum is supplied to waste gate actuator 72 via vacuum reservoir 138. Vacuum reservoir 138 may be supplied vacuum from intake manifold 44 via sonic choke 24 and check valve 60. Sonic choke 24 limits the air flow rate to an upper air flow limit while providing little pressure restriction over the range of flow rates that it allows air to pass unrestricted. Alternatively, vacuum reservoir 138 may be supplied vacuum from ejector or venturi 20 via check valve 63. In some examples, check valve 60 may be omitted. Ejector vacuum flow control valve 22 may be opened to permit compressed air from compressor 162 to pass through ejector 20. Compressed air passes through ejector 20 and creates a low pressure region within ejector 20, thereby providing a vacuum source for vacuum reservoir 138 and brake booster 140. Check valve 63 ensures air does not pass from ejector 20 to vacuum reservoir 138. Likewise, check valve 65 ensures air does not pass from ejector 20 to brake booster 140. Air exits ejector 20 and reenters the engine air intake system at a location upstream of compressor 162. Brake booster 140 may also be provided vacuum from intake manifold 44 via check valve 67. Vacuum reservoir 138 may provide vacuum to vacuum consumers such as turbocharger waste gate actuators, heating and ventilation actuators, driveline actuators (e.g., four wheel drive actuators), fuel vapor purging systems, engine crankcase ventilation, and fuel system leak testing systems. Check valve 61 prevents reverse air flow from vacuum reservoir 138 to secondary vacuum consumers (e.g., vacuum consumers other than the vehicle braking system). Brake booster 140 may include an internal vacuum reservoir, and it may amplify force provided by foot 152 via brake pedal 150 to master cylinder 148 for applying vehicle brakes (not shown).

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a position sensor 154 coupled to brake pedal 150 for sensing brake pedal position; a knock sensor for determining ignition of end gases (not shown); a measurement of engine manifold pressure (MAP) from pressure sensor 121 coupled to intake manifold 44; a measurement of boost pressure from pressure sensor 122 coupled to boost chamber 46; vacuum reservoir pressure from pressure sensor 145; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Referring now to FIG. 2, an alternative engine system is shown. All the elements commonly numbered with the elements of FIG. 1 are the same as those described in FIG. 1. Therefore, for the sake of brevity, only different elements and different structure is included in the description of FIG. 2. Elements in FIG. 2 having the same numerical identifier as elements shown in FIG. 1, are as described in FIG. 1.

In the example of FIG. 2, ejector vacuum flow control valve 22 controls air flow from boost chamber 46 through ejector or venturi 20 and to intake manifold 44 or air intake 42. Check valves 283 and 285 are positioned to allow air flow from boost chamber 46 to intake manifold 44 and air intake 42 respectively, while substantially inhibiting air flow from air intake 42 and intake manifold 44 to boost chamber 46. Thus, it is possible flow air through ejector or venturi 20 and bypass throttle 62 to intake manifold 44. If the desired engine torque is achieved via passing air through ejector 20 while throttle 62 is closed, ejector flow control valve 22 can be commanded to control air flow through ejector 20. For example, a pulse width modulated signal can drive control valve 22 such that air flows through ejector 20 at a rate suitable for providing the desired engine torque. In addition, ejector flow control valve 22 can be adjusted to close the path from boost chamber 46 during conditions where boost pressure may be insufficient to provide the requested engine torque. For example, during acceleration from idle conditions, ejector flow control valve 22 may be commanded closed to reduce turbocharger lag to improve the engine torque response. Check valves 283 and 285 are positioned such that air automatically flows from ejector 20 to the lowest pressure region along the air intake system when ejector flow control valve 22 is opened. In particular, the location where pressure is lowest in the air intake system provides the greatest delta pressure with respect to air pressure in boost chamber 46. As such, air can flow from the boost chamber 46 to the lowest pressure area of the air intake system.

It should also be mentioned that ejector flow control valve 22 may be opened to provide air flow from the compressor outlet to the compressor inlet, thereby performing the same function of compressor bypass valve 158. As such, compressor bypass valve 158 may be reduced in size or eliminated.

Thus, the systems of FIGS. 1-2 provide for a vacuum system, comprising: an engine with an intake manifold; a turbocharger coupled to the engine and supplying air the intake manifold; a vacuum reservoir; an ejector in communication with the vacuum reservoir and the turbocharger; and a controller, the controller including instructions for, supplying air from a compressor to engine cylinders, the compressor having an output capacity; directing air flow from the compressor to an ejector supplying vacuum to a vacuum reservoir when the compressor has capacity to supply more air than a desired cylinder air amount, otherwise inhibiting air flow from the compressor to the ejector; reducing the compressor's air output capacity when the compressor has capacity to supply an air amount greater than the desired cylinder air amount and a desired ejector flow rate, otherwise not reducing the compressor's air output capacity; and adjusting a position of a waste gate to adjust the compressor's air output capacity. The system includes where the controller includes further instructions for limiting a rate of vacuum consumption via vacuum consumers in response to a pressure of a vacuum reservoir. The system includes where the controller includes further instructions for adjusting the motive flow rate of the ejector to provide a desired rate of vacuum.

Referring now to FIGS. 3 and 4, simulated signals of interest during engine operation are shown. Vertical markers $T_0$-$T_{14}$ identify particular times of interest during the operating sequence. The signals of FIG. 3 and the signals of FIG. 4 are signals of a same operating sequence. Thus, times $T_0$-$T_{14}$ of FIG. 3 and FIG. 4 take place at identical times.

The first plot from the top of FIG. 3 shows an engine torque command signal versus time. Time starts at the left side of the plot and increases to the right. The engine torque command signal is at its lowest value at the bottom of the plot and it increases in magnitude toward the top of the plot. A lower torque command provides for a lower engine output torque. A higher torque command provides for a higher engine output torque. Horizontal line 302 represents a torque demand threshold whereby air flow to ejector 20 of FIG. 1 may be inhibited so that substantially all pressurized air is made available to the engine rather than the ejector. Thus, when the torque demand exceeds the torque demand threshold 302 the production of engine torque is given priority over vacuum production so that vacuum generation via the ejector ceases and substantially all air flow from the compressor is directed to engine cylinders. The torque demand threshold 302 may be adjusted (e.g., increased or decreased) in response to engine operating conditions.

The second plot from the top of FIG. 3 shows engine speed versus time. Time starts at the left side of the plot and increases to the right. Engine speed is at its lowest value at the bottom of the plot and increases toward the top of the plot.

The third plot from the top of FIG. 3 shows engine intake manifold pressure versus time. Time starts at the left side of the plot and increases to the right. Engine intake manifold pressure increases in the direction of the Y-axis arrow. Horizontal marker 304 represents atmospheric pressure in the third plot. Thus, when manifold pressure is above marker 304 the intake manifold is at a positive pressure. When manifold pressure is below marker 304 the intake manifold is at a vacuum.

The fourth plot from the top of FIG. 3 shows vacuum reservoir pressure versus time. Time starts at the left side of the plot and increases to the right. Horizontal marker 306 represents atmospheric pressure in the fourth plot. Horizontal marker 308 represents a second threshold level of vacuum reservoir pressure. Horizontal marker 310 represents a first threshold level of vacuum reservoir pressure. Vacuum reservoir vacuum is at a higher level of vacuum at the bottom of the plot.

The fifth plot from the top of FIG. 3 shows a vacuum consumption rate versus time. The Y axis has units of Kg/s air flow from a higher pressure area (e.g., a vacuum operated actuator) to a lower pressure area (e.g., vacuum reservoir 138 of FIG. 1). The X axis has units of time. Thus, the vacuum consumption rate can be expressed as $Kg/s^2$. Horizontal line 312 represents a first threshold vacuum consumption rate, and horizontal line 314 represents a second threshold vacuum consumption rate, greater than the first threshold vacuum consumption rate. First threshold vacuum consumption rate 212 and second vacuum consumption rate 214 can be adjusted for operating conditions. For example, first threshold vacuum consumption rate 212 and second vacuum consumption rate 214 can be decreased as the vehicle is operated at higher altitudes.

The first plot from the top of FIG. 4 shows turbocharger waste gate position versus time. The Y axis represents waste gate position and the X axis represents time. The waste gate is opened in the direction of the Y axis arrow and closed at the X axis.

The second plot from the top of FIG. 4 shows an ejector vacuum flow control valve command (e.g. valve 22 of FIG. 1). Time starts at the left side of the plot and increases to the right. The ejector vacuum flow control valve is open when the signal is near the top of the plot, and the ejector vacuum flow control valve is closed when the signal is near the bottom of the plot.

The third plot from the top of FIG. 4 shows a compressor bypass valve (CBV) command. The compressor bypass valve can direct air flow from the outlet of compressor 162 to the inlet of compressor 162 to limit air pressure in boost chamber 46 and to reduce compressor surge. Time starts at the left side of the plot and increases to the right. The CBV is open when the signal is near the top of the plot, and the CBV is closed when the signal is near the bottom of the plot.

The fourth plot from the top of FIG. 4 represents a signal for limiting use of vacuum by vacuum consumers other than the brake booster and other selected vacuum consumers (e.g., vacuum consumers may include but are not limited to waste gate actuators, heating and ventilation actuators, fuel vapor purging systems, drivetrain actuators, engine crankcase ventilation, and leak check systems). When the vacuum consumer command is near the top of the plot, vacuum consumers may use as much vacuum as they desire. As the vacuum consumer command is reduced, the amount of vacuum available to vacuum consumers is reduced. In other embodiments, the vacuum consumer command may be comprised of two states rather than a variable vacuum control signal. For example, the vacuum consumer command may have a first state where vacuum is made available to secondary vacuum consumers, and the vacuum consumer command may have a second state where secondary vacuum consumers are required to hold in their present state so that no additional vacuum is consumed by the vacuum consumers until the vacuum consumer command returns to the first state.

It should be noted that intake manifold pressure and vacuum reservoir pressure are not plotted to the same scale. For example, the units of the Y axis of the intake manifold pressure plot are not equivalent to the units of the Y axis of the vacuum reservoir plot.

At time $T_0$, the engine is operating at a medium engine torque (e.g., 25% of wide-open-throttle (WOT)). Further, the engine speed is at a medium engine speed (e.g., 2500 RPM), the intake manifold pressure is above atmospheric pressure, pressure in the vacuum reservoir is between a first threshold pressure 310 and a second threshold pressure 308, the vacuum use rate is at a constant low level, the ejector vacuum flow control valve is closed since there is adequate vacuum in the vacuum reservoir, the CBV is closed, and the vacuum consumer command is at a high level so that full system vacuum is available to secondary vacuum consumers (e.g. vacuum consumers other than the brake booster).

At time $T_1$, the engine torque command is reduced. The engine speed begins to decrease as less engine torque is available to rotate the engine. Intake manifold pressure also begins to decrease since less air is needed for a reduced engine torque demand. The vacuum reservoir pressure begins to increase as vacuum is used to open and then close a turbocharger waste gate. The waste gate opens further since the turbocharger can provide the desired air mass flow rate to the engine using less energy from exhaust gases. The vacuum consumption rate also increases as shown. The vacuum consumption rate may increase in response to use of vacuum by vacuum actuators (e.g., waste gate, heating and ventilation systems, driveline systems, evaporative emission systems, etc.). In one example, the vacuum consumption rate may be expressed as an air flow rate in $Kg/s^2$.

The ejector flow valve as shown in FIG. 4 remains closed since pressure in the vacuum reservoir remains below second threshold pressure 308. The CBV valve is also in a closed position since boost pressure can be reduced by opening the turbocharger waste gate. The vacuum consumer command starts to decrease as the vacuum reservoir pressure begins to increase. In some examples, the vacuum consumer command may limit vacuum consumption of vehicle vacuum actuators in response to a rate of vacuum consumption. In other examples, the vacuum consumer command may limit vacuum consumption in response to a level of vacuum in the vacuum reservoir. For example, the amount of vacuum consumed via the fuel vapor purging system may be reduced in response to the vacuum consumer command.

At time $T_2$, the engine torque command is at a low level and the engine speed continues to decrease. The engine intake manifold pressure also continues to decrease as air is pumped from the engine intake manifold to engine cylinders. The vacuum reservoir pressure increases in response to a high consumption rate of vacuum (e.g., during a brake apply and release sequence). The increase in vacuum consumption can be seen as shown in the fifth plot from the top of FIG. 3. The ejector vacuum flow control valve remains closed since pressure in the vacuum reservoir remains below second threshold pressure 308. However, shortly after time $T_2$, the ejector vacuum flow control valve is opened when pressure in the vacuum reservoir is greater than second threshold pressure 308. In some examples, the ejector may be temporarily deactivated when intake manifold pressure is low and when it is desirable to restore vacuum to the system at a high rate via the intake manifold. Since the engine has a relatively high volume it may generate a large amount of vacuum in a short amount of time via the engine intake manifold. Thus, a check valve between the vacuum reservoir and the intake manifold may open to allow air to flow from the vacuum reservoir to the intake manifold when pressure in the intake manifold is less than pressure in the vacuum reservoir. However, if the engine torque demand is at a level higher than is possible to achieve with vacuum in the intake manifold, vacuum may continue to be supplied via the ejector. The CBV remains closed and the vacuum consumer command is reduced further so as to reduce the amount of vacuum available to secondary vacuum consumers.

Between time $T_2$ and $T_3$ operation of the engine and/or drivetrain (e.g., engine and transmission) as adjusted to increase the production of vacuum within the engine intake manifold. In one example, the engine intake manifold vacuum is increased by increasing engine speed. Engine speed may be increased by down shifting a transmission or by slipping transmission clutches. Intake manifold vacuum may also be increased via at least one of reducing loads coupled to the engine (e.g., turning off air conditioning), reducing catalyst heating via reducing engine air flow, decreasing the engine throttle opening area, and via advancing intake cam timing. Intake manifold pressure is shown falling below atmospheric pressure (e.g., line 304). Since a check valve between the intake manifold and the vacuum reservoir opens when pressure in the intake manifold is lower than pressure in the vacuum reservoir, the vacuum reservoir pressure is reduced via flowing air from the vacuum reservoir to the intake manifold. The vacuum consumer command begins to increase as the amount of vacuum in the vacuum reservoir increases. In other examples, the vacuum consumer command can be adjusted in response to a rate that vacuum is produced or a difference between an amount of vacuum consumed and an amount of vacuum produced. Also note that between time $T_2$ and $T_3$, the desired engine torque amount can be provided even when the turbocharger waste gate is partially open and even though air is flowing to the ejector to produce vacuum for the vacuum reservoir. In one example, the turbocharger waste gate is operated such that the waste gate is not opened unless the desired engine torque is provided. Further, the turbocharger waste gate is not opened if vacuum is being requested and the ejector is providing less than the desired vacuum rate. Thus, priority of turbocharger operation is to first provide the desired engine torque. Second, provide the desired amount of vacuum via air flow through the ejector. Third, open the waste gate to reduce engine pumping work.

At time $T_3$, the pressure in the vacuum reservoir reaches a level less than a first threshold pressure 310. Consequently, the engine operating conditions are adjusted to where intake manifold pressure can increase to reduce engine pumping work. Engine torque command and engine speed remain at low levels during the time the vacuum reservoir pressure is decreased. It should be noted that the engine may be operated at least in part in response to a rate of vacuum consumption rate rather than simply attempting to generate vacuum under conditions that the engine usually operates. For example, engine speed can be increased in proportion to a vacuum consumption rate. In this way, the production of engine vacuum may be adjusted to balance vacuum supply with vacuum consumption. The ejector flow valve is also closed at time $T_3$ since pressure in the vacuum reservoir is less than the first pressure threshold 310. The turbocharger waste gate position stabilizes at a partially open position to reduce fuel consumption and limit turbocharger speed. The CBV also remains closed since it is not desired to reduce pressure in the boost chamber.

At time $T_4$, the engine torque command and engine speed increase. Such conditions may be present during an operator tip-in (e.g., depression of an accelerator pedal) during a drive cycle. The vacuum use rate also increases at time $T_4$ (e.g., via adjusting a turbocharger waste gate position and brake pedal release) and the vacuum reservoir pressure increases as the vacuum consumption rate increases. Further, the ejector vacuum flow control valve is opened shortly after time $T_4$ to increase the vacuum supply. Thus, air flow to the ejector is increased so that vacuum may be produced via the ejector thereby decreasing pressure in the vacuum reservoir. The vacuum consumer command is also decreased in response to the rate vacuum is consumed, or alternatively, in response to a pressure or a rate of pressure change within the vacuum reservoir.

Between time $T_4$ and $T_5$ air flows to the ejector from the turbocharger compressor and vacuum produced at the ejector lowers the pressure level in the vacuum reservoir. The vacuum generation via the ejector may be activated when the intake manifold pressure is greater than atmospheric pressure, when intake manifold pressure is greater than vacuum reservoir pressure and generating vacuum via the ejector is more efficient than generating vacuum via the intake manifold, or when it is desirable to provide vacuum via the intake manifold and the ejector. In some examples, a flow rate of air passing through the ejector can be adjusted via modulating a valve at the inlet or outlet of the ejector. In many examples, it is desirable to increase the compressor flow rate so that engine power may be maintained while increased compressor flow produces vacuum via the ejector. Thus, the turbocharger waste gate may be at least partially closed in response to a request to produce vacuum via the ejector. Further, the engine torque command and the engine speed are held substantially constant during the time between $T_4$ and $T_6$.

At time $T_6$, the engine torque command and engine speed are increased by more than double the respective amounts before time $T_6$. The ejector vacuum flow control valve is closed to increase the engine air flow. Since the pressure in the vacuum reservoir is below the second pressure threshold 308 and since the desired torque may not be provided instantaneously with the engine torque demand, air flow to the ejector is deactivated. Pressure in the vacuum reservoir also increases after time $T_6$ in response to the increased vacuum consumption rate. The vacuum consumer command is also decreased so that the amount of vacuum available to secondary vacuum consumers is reduced. The waste gate is also initially closed to increase air flow to the engine so that turbocharger lag is reduce. As engine torque begins to match the desired engine torque the waste gate begins to open.

At time $T_7$, the engine torque command and the engine speed are reduced. Accordingly, the compressor air flow rate is also reduced via opening the turbocharger waste gate; however, the compressor continues to operate at an air flow rate above the engine air flow rate to provide the desired engine torque and ejector vacuum. The compressor continues to operate at a flow rate above the engine air flow rate because pressure in the reservoir is greater than the second vacuum reservoir pressure threshold 308. Thus, the ejector vacuum control flow valve is opened at $T_7$ so that air can continue to pass through the ejector, thereby producing vacuum for the vacuum reservoir. The change in the engine torque command can also increases the vacuum consumption rate when the system includes a turbocharger having a waste gate that is adjusted in response to torque demand. The increased vacuum consumption rate causes the vacuum reservoir pressure to increase.

At time $T_8$, the engine torque command is once again increased and the turbocharger waste gate is closed to increase engine torque. The vacuum consumption rate also increases as the position of the turbocharger waste gate and other vacuum actuators are adjusted (e.g., the brake pedal is released). The vacuum reservoir pressure is shown increasing in response to the increased vacuum consumption rate, and the intake manifold pressure is greater than atmospheric pressure. However, the actual engine torque is less than the desired engine torque because of turbocharger delay, so the ejector is briefly deactivated at $T_8$ so more air flows to the engine thereby increasing engine torque. The ejector vacuum flow control valve is opened again between times $T_8$ and $T_9$ when actual engine torque reaches desired engine torque so that vacuum production is active. In addition, the vacuum consumer command is reduced so that secondary vacuum consumers may be limited in the amount of vacuum they may consume.

At time $T_9$, the engine torque command reaches a torque demand threshold (e.g., horizontal line 302) where air flow to the ejector may be inhibited so that substantially all pressurized air is made available to the engine rather than the ejector. Consequently, the ejector vacuum flow control valve is closed so that substantially all air flow from the compressor may be directed to the engine and intake manifold. In this way, priority of compressor air is given to engine torque production. Thus, vacuum production and engine backpressure limiting are temporally inhibited.

Between time $T_9$ and $T_{10}$, engine torque and engine speed continue to increase while vacuum reservoir pressure gradually increases as the vacuum consumption rate increases with adjustments to the turbocharger waste gate and other vacuum consumers. The vacuum consumer command is decreased further as the vacuum reservoir pressure increases.

At time $T_{10}$, the engine torque command and engine speed are reduced. The engine torque command and engine speed may decrease as shown when a driver releases an accelerator pedal after high load acceleration. Further, the intake manifold pressure is reduced at a first rate so that engine torque is reduced, and a short time later, intake manifold pressure is reduced at a second rate in response to an increase in the consumption rate of vacuum so that the pressure increase in the vacuum reservoir can be reduced. The vacuum consumption rate may increase at a higher rate in response to vacuum consumed during vehicle brake application and release. For example, vacuum is used to assist the operator during depression of the brake, and vacuum is used to evacuate atmospheric pressure from the brake booster when the brake pedal is released. The vacuum reservoir pressure initially increases and then begins to decrease between time $T_{10}$ and time $T_{11}$. The rate of pressure decrease in the vacuum reservoir may be related to the pressure differential between the vacuum reservoir and the intake manifold as well as to the amount of restriction between the intake manifold and the vacuum reservoir.

The consumption rate of vacuum at time $T_{10}$ has increased to a level greater than a second vacuum consumption rate 314. Therefore, the engine operation is adjusted to increase intake manifold vacuum. For example, the engine throttle opening may be decreased and intake valve timing may be adjusted to increase effective cylinder volume (e.g. opening intake valves slightly before top dead center intake stroke and closing intake valves slightly after bottom dead center intake stroke) while maintaining the desired engine torque via increasing engine speed. Further, engine speed may be increased via changing transmission gears or transmission clutch slippage, alternator and air conditioning may be deactivated, and spark timing may be advanced.

In some examples, the pressure level in the vacuum reservoir may also be a parameter for deciding whether or not to generate vacuum via the engine intake manifold. For example, if vacuum reservoir pressure is less than a first threshold, no vacuum is requested via ejector or intake manifold. If vacuum reservoir pressure is greater than the first threshold, but less than a second threshold, vacuum is request via the ejector but not the intake manifold. If vacuum reservoir pressure is greater than the third threshold, vacuum is request via the intake manifold and the ejector. In other examples, a combination of vacuum consumption rate and vacuum reservoir pressure may be used to determine whether or not to provide vacuum and from which source vacuum is provided. For example, if vacuum reservoir pressure is greater than a first threshold and less than a second threshold while vacuum consumption rate is higher than a second threshold, vacuum may be provided via the intake manifold. On the other hand, if vacuum reservoir pressure is greater than a second threshold and vacuum consumption rate is lower than a second threshold, vacuum may be provided via the ejector.

The ejector vacuum flow valve opens at time $T_{10}$ to provide vacuum and to act as a CBV. Further, the CBV also activated to reduce boost pressure after the engine torque request is reduced so that excess air pumped by the compressor may be discarded. In addition, the vacuum consumer command is initially decreased in response to the vacuum reservoir pressure and the vacuum consumption rate, and then the vacuum consumer command is increased to allow secondary vacuum consumers to use additional vacuum. The turbocharger waste gate goes from a closed position to an open position so as to reduce output from the turbocharger compressor. As boost pressure is reduced, the waste gate position can be closed so that the compressor flow rate approaches the engine air flow rate.

At time $T_{11}$, the vacuum reservoir pressure has been reduced to the first threshold level pressure 310. Therefore, the intake manifold vacuum flow control valve is closed and the engine is adjusted to conditions for improving fuel economy and emissions. The intake manifold pressure may be increased during such conditions.

At time $T_{12}$, the engine torque command and engine speed are once again increased. The intake manifold pressure also rises to near atmospheric pressure and the vacuum consumption rate increases as the turbocharger waste gate position and other vacuum actuators are adjusted. In addition, the vacuum reservoir pressure also increases as the vacuum consumption rate increases. Therefore, compressed air is directed to the ejector via opening the ejector vacuum flow control valve. And, the vacuum consumer command is decreased since less vacuum is available via the vacuum reservoir.

At time $T_{13}$, the engine torque and engine speed in response to an increasing engine torque command. The turbocharger waste gate is also closed so that the actual engine torque may approach the engine torque command at a faster rate. Further, the ejector vacuum flow control valve is closed to direct air flow to the engine rather than to the ejector. In addition, closing the waste gate increases the engine backpressure. After the engine torque reaches the engine torque command, the waste gate is partially opened and the ejector vacuum flow control valve is opened to provide vacuum to the vacuum reservoir.

At time $T_{14}$, the vacuum reservoir pressure decreases to the first threshold pressure level 310. Consequently, additional vacuum is not requested and so the ejector vacuum flow control valve is set to a closed position. The vacuum consumer command is also increased to a level where full vacuum is available to secondary vacuum consumers.

Referring now to FIGS. 5 and 6, the signals and plots of FIGS. 5 and 6 are similar to those shown in FIGS. 3 and 4; however, FIGS. 5 and 6 illustrate intake manifold pressure for a two intake passage intake manifold. And, the vacuum reservoir is in communication with only a first of the two intake passages of the intake manifold. Since the plots and signals are similar, the description of FIGS. 5 and 6 will be limited to new signals and differences as compared to FIGS. 3 and 4 for the sake of brevity. Further, similar numerical markers such as 302 and 502 have the same description and function between FIGS. 3-4 and FIGS. 5-6.

In the third plot from the top of FIG. 5, two intake manifold pressure traces 520 and 522 are shown. Trace 520 represents pressure in a first passage in the intake manifold while trace 522 represents pressure in a second passage in the intake manifold. The first and second passages may be isolated from each other such that the first passage can operate at pressures that are different from pressures in the second passage. In one example, the first passage may supply air to a first group of cylinders, of which, one cylinder from the first group of cylinders combusts every other combustion event, and where each cylinder in the first group combusts an air-fuel mixture once during an engine cycle. The second passage may supply air to a second group of cylinders, of which, one cylinder from the second group of cylinders combusts after a cylinder in the first group of cylinders, and where each cylinder in the second group combusts an air-fuel mixture once during an engine cycle. For example, a four cylinder engine having a combustion order of 1-3-4-2 includes a first passage in the intake manifold supplying air to cylinders 1 and 4 while a second passage in the intake manifold supplies air to cylinders 2 and 3.

During time between $T_2$ and $T_4$ as well as time between $T_{10}$ and $T_{13}$, the two intake air passages operate at different pressures. The air pressure in the first passage is reduced to provide vacuum to the vacuum reservoir, and the air pressure of the second passage is at a higher level to reduce engine pumping work. The reduction in air pressure of the first passage is in response to the vacuum consumption rate exceeding the second vacuum consumption rate 514. In other examples, the pressure in the first passage may be decreased as compared to the pressure in the second passage in response to pressure in the vacuum reservoir. In still other examples, the pressure in the first passage may be reduced as compared to the pressure in the second passage in response to the vacuum consumption rate and the pressure in the vacuum reservoir. Once the pressure in the vacuum reservoir reaches the first pressure threshold 510, the pressure in the first intake manifold is allowed to increase so as to reduce the engine pumping work. The pressure in the first intake manifold may be reduced by any of the previously mentioned methods. For example, the intake manifold pressure may be decreased by closing the intake throttle and increasing engine speed. The remaining sequence and signals of FIGS. 5-6 are as described in FIGS. 3-4.

Referring now to FIG. 7, a high level flowchart for supplying vacuum in a system having an ejector is shown. The method of FIG. 7 is executable by instructions of controller 12 of FIG. 1.

At 702, method 700 determines engine operating conditions. Engine operating conditions include but are not limited to engine speed, engine load, vacuum reservoir pressure, engine intake manifold pressure, intake throttle position, brake actuator position, and desired engine torque. Method 700 proceeds to 704 after engine operating conditions are determined.

At 704, method 700 judges whether or not additional vacuum is requested to replenish vacuum in the vacuum reservoir and the vehicle vacuum system. In one example, additional vacuum may be requested when pressure in the vacuum reservoir exceeds a second pressure threshold. Further, accumulation of additional vacuum may be inhibited by closing the ejector flow control valve when pressure in the vacuum reservoir is less than a first pressure threshold. If method 700 judges additional vacuum is requested, method 700 proceeds to 706. Otherwise, method 700 proceeds to 720. In other examples, air flow may be directed from the compressor to the ejector valve simply when a ratio of compressor output pressure to compressor flow is less than a threshold. For example, air flow can be directed from the compressor to the ejector during compressor surge conditions. comprising directing air flow from the compressor to the ejector when a ratio of compressor output pressure to compressor flow is less than a threshold.

At 720, method 700 closes the ejector flow control valve. The ejector flow control valve may be closed so as to increase the efficiency of the turbocharger compressor since closing the ejector flow control ceases air flow back to the turbocharger compressor input, at least in one example. Method 700 proceeds to exit after the ejector flow control valve is closed.

At 706, method 700 determines an engine air amount to provide a desired amount of torque. Method 700 also adjusts a vacuum consumer command that limits the amount of vacuum used by vacuum consumers in response to a pressure in the vacuum reservoir. In one example, the vacuum consumer command is stored in a table that is indexed via the pressure in the vacuum reservoir. The vacuum consumer command is a signal that reduces the amount of vacuum that is available to vacuum consumers when pressure rises in the vacuum reservoir. The vacuum consumer command is transmitted to vacuum consumers and the amount of vacuum each vacuum consumer may use to operate is limited. Some vacuum consumers such as vehicle brakes may utilize full vacuum use capacity even when the vacuum consumer command requires consumption of less vacuum.

The engine air amount may be stored in tables indexed via engine speed and engine torque request. The operator or a controller supplies a desired engine torque amount and the engine air amount is extracted from an empirically determined table. Method 700 proceeds to 708 after the engine air amount is determined.

At 708, method 700 judges whether or not the engine air amount is less than the turbocharger when the turbocharger's waste gate is closed at the present engine operating conditions. If so, method 700 proceeds to 710. Otherwise, method 700 proceeds to 718.

In other examples, method 700 may consider the rate of vacuum consumption and/or the engine torque request. For example, if the engine torque request is greater than a threshold torque, method 700 can proceed to 710. Similarly, if the rate of vacuum consumption is greater than a threshold rate of vacuum consumption, method 700 may proceed to 710. The engine torque request and the vacuum consumption rate may be conditions that are added to the condition that the engine air amount is less than the turbocharger output capacity at present operating conditions. Thus, if the engine torque request is greater than a threshold torque amount, method 700 proceeds to 718 so that substantially all air from the turbocharger compressor may be directed to the engine and so that the ejector flow control valve can be closed.

At 718, method 700 routes substantially all air flow from the turbocharger compressor to the engine. The turbocharger output is directed to the engine via closing the ejector flow control valve and the turbocharger waste gate. In this way, substantially all air is directed from the turbocharger to the engine during conditions when the turbocharger output cannot keep up with the desired torque demand. For example, the ejector flow control valve may be closed when the engine torque demand is changed from a small amount to a large amount in a short period of time, such as during a throttle tip-in (e.g., depression of a throttle actuator) by an operator. By routing substantially all turbocharger output to the engine, more engine torque may be provided sooner. In one example, the air flowing to the ejector can be stopped in response to an increasing engine torque level demand. In other examples, the air flowing to the ejector can be stopped to reduce turbocharger lag and increase turbocharger speed by increasing engine air amount. Method 700 proceeds to exit after the output of the turbocharger is routed to the engine.

At 710, method 700 determines a desired vacuum flow rate and a desired ejector motive flow rate to provide the desired vacuum to the vacuum reservoir. In one example, the desired vacuum flow rate may be determined from the vacuum consumers and the rate vacuum is being consumed by the vacuum consumers. The vacuum consumption rate or vacuum flow rate of each vacuum consumer may be empirically determined and stored in memory of the controller. The vacuum consumption rate of each vacuum actuator may be indexed via appropriate variables. For example, the rate of vacuum consumed via a brake booster may be determined via indexing a table that is indexed by brake pedal position and rate of change is brake pedal position.

The ejector motive flow rate may be determined by indexing an empirically determined table that relates vacuum flow rate to ejector motive flow rate. For example, the vacuum flow rate can index a table, and the table outputs the ejector motive flow rate. In one example, the ejector flow rate can be increased by increasing the throttle inlet pressure in the boost chamber. Method 700 proceeds to 712 after the vacuum flow rate is determined.

At 712, method 700 judges whether or not the engine air flow amount plus the ejector motive flow rate is less than the turbocharger air flow capacity with the turbocharger waste gate in a closed position. If so, method 700 proceeds to 714. Otherwise, method 700 proceeds to 716.

At 714, method 700 adjusts the ejector motive flow rate (e.g., the flow rate to provide the desired vacuum flow rate) to a desired ejector motive flow rate. Method 700 also adjusts the engine air flow rate to the desired engine air flow rate at 714 so that the desired engine torque may be provided. Further, method 700 adjusts the position of a turbocharger waste gate to provide the desired boost pressure and limits engine backpressure and turbine speed.

In one example, the engine air flow rate is adjusted via selecting a throttle position and a boost pressure in the boost chamber downstream of a turbocharger compressor. In particular, the engine air flow rate is set by positioning the throttle where the desired engine air flow rate is present based on a pressure difference between the boost chamber and the intake manifold. The boost chamber pressure may be set according to empirically determined data stored in memory of a controller indexed by engine speed and engine torque demand. The ejector motive flow rate may be set via further adjusting the boost pressure. In addition, in some examples the ejector motive flow rate can be further adjusted via modulating a position of a valve located at the inlet of the ejector. The waste gate position is set via a vacuum actuator, and the waste gate position is adjusted according to a table that provides a waste gate position in response to a desired level of boost pressure at the present engine speed. The waste gate position may also be adjusted responsive to the boost pressure. Method 700 exits after adjusting the waste gate, ejector motive flow rate, and the engine air flow rate.

At 716, method 700 adjusts the ejector motive flow rate and the engine air amount so that engine air amount plus the ejector motive flow rate substantially equals the turbocharger output capacity at the present engine operating conditions when the turbocharger waste gate is closed. In one example, the boost pressure and the engine air amount are set as described at 714, and the ejector motive flow rate is adjusted so that the desired engine air amount is delivered to the engine while at least a portion of the desired ejector motive flow rate is delivered via air flow to the ejector. Since the output capacity of the turbocharger is less than the sum of the desired engine air amount and the desired ejector motive flow rate, only a portion of the desired ejector motive flow rate may be delivered to the ejector. The air flow rate provided to the ejector may be modulated via a valve so that the desired boost pressure to achieve the desired engine air amount is present. Accordingly, the turbocharger waste gate may remain closed at 716. In addition, where the air flow from the compressor to the ejector is routed to the engine intake manifold, the air entering the engine intake manifold may be limited in response to a desired engine torque and a throttle position. For example, if the air flow from the compressor to the ejector will provide more torque than is desired when the air intake throttle is closed, air flow from the ejector to the intake manifold may be limited to an amount that provides the desired torque at stoichiometric combustion conditions. Method 700 exits after adjusting the ejector motive flow rate and the engine air flow rate. The waste gate remains closed at 716.

In this way, the method of FIG. 7 prioritizes output and operation of the turbocharger. Specifically, when the engine air amount demand cannot be met by the turbocharger output, substantially all air output from the turbocharger is directed to the engine. If the turbocharger has the capacity to provide the desired engine air amount and at least a portion of the desired ejector motive flow, the engine receives the desired engine air amount and the ejector receives at least a portion of the desired ejector motive flow rate. If the turbocharger has the capacity to provide the desired engine air amount, the desired ejector motive flow rate, and additional air, the turbocharger waste gate may be at least partially opened to reduce engine backpressure and control turbocharger turbine speed.

Thus, the method of FIG. 7 provides for a method for providing vacuum, comprising: supplying air from a compressor to engine cylinders, the compressor having an air output capacity; directing air flow from the compressor to an ejector supplying vacuum to a vacuum reservoir when the compressor has capacity to supply more air than a desired cylinder air amount, otherwise inhibiting air flow from the compressor to the ejector. As such, the method of FIG. 7 provides for selectively operating an ejector to provide vacuum within a vacuum system. The method also includes where the air output capacity of the compressor varies with engine operating conditions, and where directing air from the compressor to the ejector occurs when a pressure of a vacuum reservoir is more than a threshold pressure. The method includes where air flow from the compressor to the ejector is routed to an air intake system of an engine at a first or second location, the first location an intake manifold, the second location an inlet of the compressor. The method also includes where air flow from the compressor to the ejector entering the intake manifold is limited in response to a desired engine torque and a throttle position. The method includes where air flow from the ejector selectively exits into the intake manifold or the inlet of the compressor via check valves. The method includes where a throttle position is adjusted in response to air flow from the ejector to the intake manifold. In this way, the method provides the desired engine torque while providing vacuum via the ejector. The method includes where the air flow from the compressor to the ejector is adjusted in response to a vacuum consumption rate within the vacuum system. The method includes where inhibiting air flow from the compressor to the ejector occurs during a throttle tip-in. Thus, the method can provide increased engine torque when vacuum generation may be less of a consideration. The method further comprises reducing an amount of air flowing through the ejector in response to a torque demand exceeding a threshold torque demand.

The method of FIG. 7 also provides for a method for providing vacuum, comprising: supplying air from a compressor to engine cylinders, the compressor having an air output capacity; directing air flow from the compressor to an ejector supplying vacuum to a vacuum reservoir when the compressor has capacity to supply more air than a desired cylinder air amount, otherwise inhibiting air flow from the compressor to the ejector; and reducing the compressor's air output capacity when the compressor has capacity to supply an air amount greater than the desired cylinder air amount and a desired ejector flow rate, otherwise not reducing the compressor's air output capacity. The method includes where the compressor's air output capacity is reduced via opening a waste gate or adjusting a vane of a turbine. The method also further comprises reducing air flow from the compressor to the ejector in response to an increasing torque request and increasing air flow from the compressor to the engine. Thus, the air provided to the ejector can be supplied to the engine acting as part of an engine torque reserve without having to have the compressor speed increase instantaneously. The method includes where air flow from the compressor to the ejector is routed to an air intake system of an engine at one of a first or second location, the first location an intake manifold, the second location an inlet of the compressor. The method further comprises increasing flow to the ejector to reduce throttle inlet pressure. The method further comprises ceasing air flow from the compressor to the ejector supplying vacuum to a vacuum reservoir when a desired engine air flow rate is less than a threshold air flow rate. The method also further comprises ceasing air flow from the compressor to the ejector supplying vacuum to the vacuum reservoir to increase speed of the compressor. The method includes where a throttle inlet pressure is increased in response to directing air flow from the compressor to the ejector supplying vacuum to the vacuum reservoir.

As will be appreciated by one of ordinary skill in the art, the methods described in FIG. 7 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for providing vacuum, comprising:
supplying air from a compressor to engine cylinders, the compressor having an air output capacity;
directing air flow from the compressor to an ejector supplying vacuum to a vacuum reservoir when the compressor has capacity to supply more air than a desired cylinder air amount, otherwise inhibiting air flow from the compressor to the ejector; and
reducing an amount of air flowing through the ejector in response to a torque demand exceeding a threshold torque demand.

2. The method of claim 1, where the air output capacity of the compressor varies with engine operating conditions, and where directing air from the compressor to the ejector occurs when a pressure of a vacuum reservoir is more than a threshold pressure.

3. The method of claim 1, where air flow from the compressor to the ejector is routed to an air intake system of an engine at one of a first or second location, the first location an intake manifold, the second location an inlet of the compressor.

4. The method of claim 3, where air flow from the compressor to the ejector entering the intake manifold is adjusted based on a desired engine torque and a throttle position.

5. The method of claim 3, where air flow from the ejector selectively exits into the intake manifold or the inlet of the compressor via check valves.

6. The method of claim 3, where a throttle position is adjusted in response to air flow from the ejector to the intake manifold, and further comprising controlling compressor surge via directing air flow from the compressor to the ejector when a ratio of a pressure ratio across the compressor to a compressor flow rate is greater than a threshold.

7. The method of claim 1, where air flow from the compressor to the ejector is adjusted in response to a vacuum consumption rate within a vacuum system.

8. The method of claim 1, where inhibiting air flow from the compressor to the ejector occurs during a throttle tip-in.

9. A method for providing vacuum, comprising:
supplying air from a compressor to engine cylinders, the compressor having an air output capacity;
directing air flow from the compressor to an ejector supplying vacuum to a vacuum reservoir when the compressor has capacity to supply more air than a desired cylinder air amount, otherwise inhibiting air flow from the compressor to the ejector;
reducing the compressor's air output capacity when the compressor has capacity to supply an air amount greater than the desired cylinder air amount and a desired ejector flow rate, otherwise not reducing the compressor's air output capacity; and
reducing air flow from the compressor to the ejector in response to an increasing torque request and increasing air flow from the compressor to the engine.

10. The method of claim 9, where the compressor's air output capacity is reduced via opening a waste gate or adjusting a vane of a turbine.

11. The method of claim 9, where air flow from the compressor to the ejector is routed to an air intake system of an engine at one of a first or second location, the first location an intake manifold, the second location an inlet of the compressor.

12. The method of claim 9, further comprising increasing flow to the ejector to reduce throttle inlet pressure.

13. The method of claim 9, further comprising ceasing air flow from the compressor to the ejector supplying vacuum to the vacuum reservoir when a desired engine air flow rate is less than a threshold air flow rate.

14. The method of claim 9, further comprising ceasing air flow from the compressor to the ejector supplying vacuum to the vacuum reservoir to increase speed of the compressor.

15. The method of claim 9, where a throttle inlet pressure is adjusted in response to directing air flow from the compressor to the ejector supplying vacuum to the vacuum reservoir.

16. A vacuum system, comprising:
an engine with an intake manifold;
a turbocharger coupled to the engine and supplying air to the intake manifold;
a vacuum reservoir;
an ejector in communication with the vacuum reservoir and the turbocharger; and
a controller, the controller including instructions stored in non-transitory memory for supplying air from a compressor to engine cylinders, the compressor having an output capacity; directing air flow from the compressor to an ejector supplying vacuum to a vacuum reservoir when the compressor has capacity to supply more air than a desired cylinder air amount, otherwise inhibiting air flow from the compressor to the ejector; reducing the compressor's air output capacity when the compressor has capacity to supply an air amount greater than the desired cylinder air amount and a desired ejector flow rate, otherwise not reducing the compressor's air output capacity; and adjusting a position of a waste gate to adjust the compressor's air output capacity, where the controller includes further instructions stored in non-transitory memory for adjusting a motive flow rate of the ejector to provide a desired rate of vacuum.

17. The system of claim 16, where the controller includes further instructions stored in non-transitory memory for limiting a rate of vacuum consumption via vacuum consumers in response to a pressure of the vacuum reservoir.

* * * * *